INVENTORS
John Rosa and
Peter E. Pityk
BY
ATTORNEY

United States Patent Office 3,302,089
Patented Jan. 31, 1967

3,302,089
SYSTEM FOR CONTROLLING THE OUTPUT OF PLURAL FIELD DYNAMOELECTRIC MACHINE
John Rosa, Pittsburgh, and Peter E. Pityk, Penn Hills Township, Allegheny County, Pa., assignors to Westinghouse Electric Corporation, Pittsburgh, Pa., a corporation of Pennsylvania
Filed Feb. 7, 1964, Ser. No. 343,397
17 Claims. (Cl. 318—257)

This invention relates to apparatus for controlling dynamoelectric machines, and more particularly to a system for regulating the speed of an electric motor.

Split field D.C. motors are used extensively for positioning control and other servo applications. In a previously proposed system illustrated in FIG. 1, variable D.C. is applied to one or the other field windings from an A.C. source through controlled rectification employing controlled electric valves. In this system, the respective field windings may be alternately energized with a rate of reversal that is at best limited by the frequency of the A.C. supply. This limits the speed and smoothness of response in a regulating system. Another disadvantage of this circuit is that relatively complex and expensive firing angle control circuits must be employed to provide gating signals which must be definitely timed or phase related to a phase reference.

This invention contemplates a dual field dynamoelectric machine control apparatus employing controlled valves for alternately energizing the oppositely related fields, and wherein the rate of reversal is at least theoretically limited only by the relatively fast recovery time of the controlled valves.

The invention may be practiced in accordance with one embodiment thereof by a system employing a commutating capacitor to apply reverse or blocking voltage across a controlled valve supplying one field winding in response to initiation of conduction through a valve supplying the other field winding. In this system, the valves are fired by gate signals that need not have a definite phase relation to some phase reference.

It is, therefore, an object of the present invention to provide a faster responding control system for a dynamoelectric machine having first and second excitation windings providing oppositely related control effects.

Another object of the invention is to provide a control system for a dynamoelectric machine having oppositely related excitation windings supplied through alternately gateable valves, in which system the valves are fired by gate signals that need not have a definite phase relation to some phase reference.

Other and further objects and advantages of the invention will become apparent from the following detailed description taken in connection with FIG. 2 of the accompanying drawing wherein a preferred embodiment of the invention is illustrated.

Figure 1:
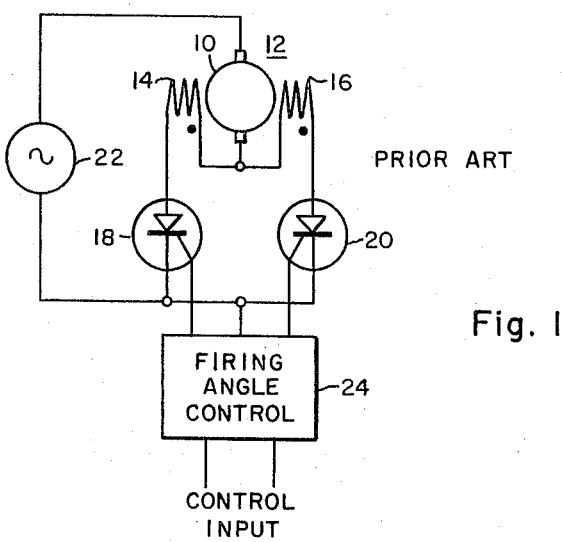
FIGURE 1 is a diagram of a previously proposed motor control system.

The previously proposed circuit of FIG. 1 includes a split field series D.C. motor 10 having an armature 12 and forward and reverse field windings 14 and 16, which are alternately energized through controlled valves 18 and 20 respectively from a source of A.C. 22. The common junction of the valves is connected to one side of the A.C. source, while the other side of the A.C. source is connected through the armature 12 to the junction between the field windings 14 and 16. A firing pulse positioner 24 supplies firing (gating) pulses alternatively to one or the other valves as determined by an input control signal applied to the input lines 26. The gating pulses applied to the valves have a definite phase relation with the voltage waves of the A.C. supply. The operation of this circuit is self-evident and known, and as hereinbefore pointed out the speed of field supply reversal is limited by the frequency of the A.C. supply.

Figure 2:
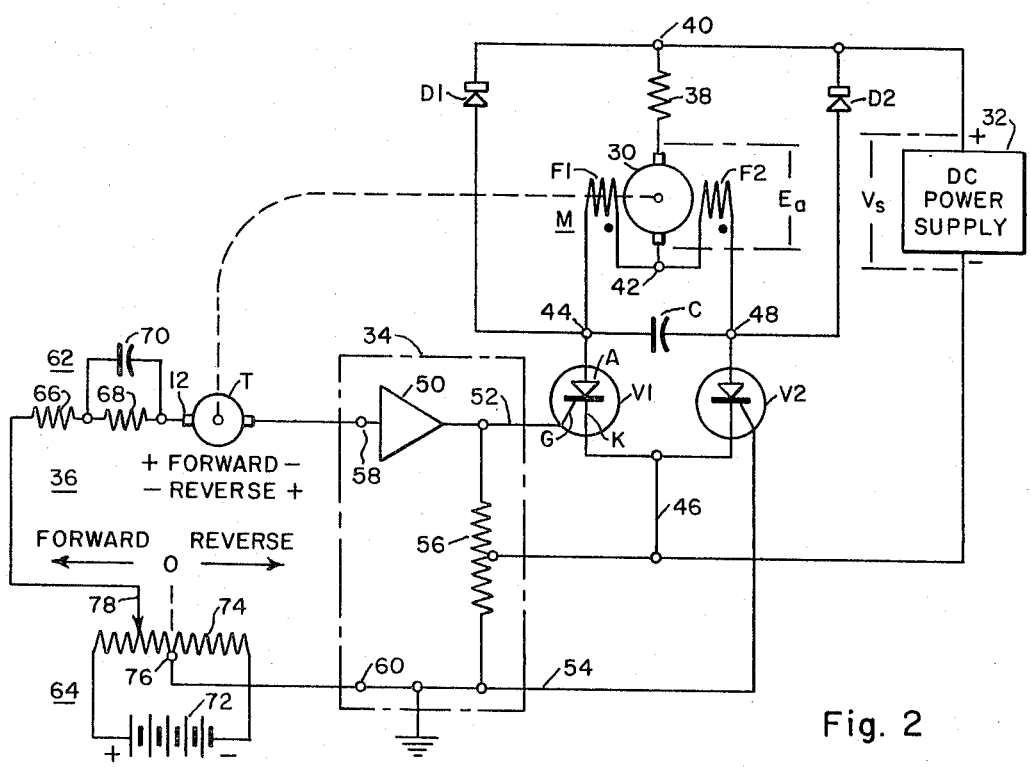
FIG. 2 is a diagram of a motor speed regulating system embodying the invention.

Referring now to FIG. 2, the speed regulator shown therein includes a split field D.C. series motor M having an armature 30 and forward and reverse field windings F1 and F2 respectively, which are alternately supplied from a D.C. source 32 by controlled valves V1 and V2. These valves are alternately gated by a drive circuit 34 that is controlled by an error generating network 36, which responds to deviation of the motor speed from a desired norm or selected speed.

Each of the valves V is provided with power current inlet and power current outlet electrodes A and K, respectively, and a control electrode G. The control input circuit of a controlled valve includes the control electrode and one of the power current electrodes, while the power or main current path of the valve extends from the power current inlet electrode to the power current outlet electrode.

The valves V normally block current flow in both forward and reverse directions, however, in response to the application of a control signal of appropriate magnitude and polarity to the controlled electrode of the valve while the valve is voltage biased in a particular direction, the valve is rendered highly conductive (fired) in the latter direction, generally referred to as the forward direction. Conduction continues until the power current through the valve falls below a predetermined minimum (holding value). Turn-off is accomplished by applying a sufficient reverse voltage across the valve. Although other suitable valves such as thyratrons, etc. may be employed, the system is especially effective with solid state controlled valves, for example the silicon controlled rectifiers shown at V (V1 and V2). The respective inlet, outlet and control electrodes of a silicon controlled rectifier are usually referred to as the anode, cathode and gate electrodes respectively. In silicon controlled rectifiers, the control circuit usually includes the gate and cathode electrodes.

With specific regard to silicon controlled rectifiers, forward voltage is applied to them when the anode is made positive relative to the cathode. With the appropriate positive voltage on the anode A, the controlled valve V will be fired (rendered conductive) when the gate electrode G has applied thereto a voltage of appropriate polarity and magnitude to forward bias the gate junction. In the example shown a valve V is gated when positive drive (relative to cathode) is applied to the gate electrode.

The armature winding 30 is connected through a resistor 38 to a junction 40, which in turn is connected to the positive terminal of the D.C. source 32. The other end of the armature 30 is connected to a common junction 42 which in turn is connected to the upper ends of field windings F1 and F2. The lower end of the forward field winding F1 is connected through a junction 44, the main current path of valve V1 and a circuit link 46 to the negative terminal of the D.C. supply 32. In like manner, the lower end of the reverse field winding F2 is connected through a junction 48 and the main current path of valve V2 to the circuit link 46 and the negative terminal of the D.C. power supply 32.

The drive circuit 34 is of any suitable type which provides a bi-directional output, that is an output whose polarity reverses with reversal of net input polarity. In order to provide high response speed, the driver circuit 34 may be a high gain amplifier circuit which requires a very small input increment to rapidly change the state of the output and to provide gating power to the valves. For example, the driver 34 may be an operational amplifier as illustrated at 50. Across the output lines 52 and 54 of the amplifier there is connected a center tapped resistor 56 to provide an electrical center for the output of the amplifier. The center tap of this resistor is connected through the circuit link 46 to the cathodes of valves V1 and V2. The driver output line 52 is connected to the gate electrode of valve 1 while the output line 54 is connected to the gate electrode of valve V2. In this way when a positive signal is applied to the gate electrode of valve V1, a negative signal is applied to the gate electrode of valve V2 and vice versa.

The input lines 58 and 60 of amplifier 50 are energized by an error signal developed by the error generating network 36 which includes a tachometer generator T mechanically coupled to the rotor of motor M to produce an output voltage indicative of direction and speed of the motor. In the example, tachometer T, as indicated by the legend below it, produces an output voltage at an output terminal 12 which is positive when the motor is running in the forward direction and negative when the motor is running in the reverse direction.

The tachometer generator T is part of the series network between the driver input terminals 58 and 60, which series circuit also includes a lead network 62 and a source of reference voltage 64. The lead network 62 which provides an anticipation component in response to rate of change of speed includes resistors 66 and 68 and a capacitor 70. Reference source 64 includes a D.C. source such as a battery 72 connected across a center tap potentiometer 74 having a center tap 76 connected to the input line 60 of driver 34 and a movable contact arm or wiper 78 connected through the lead network 62 to the tachometer generator terminal 12. In the example shown, the reference source 64 provides a positive signal at the potentiometer arm 78 to provide forward rotation from motor M, and a negative signal at the arm 78 to operate the motor M in the reverse direction. Thus, depending on the position of potentiometer arm 78, the reference source 64 provides a speed reference signal whose polarity and magnitude represent the desired direction and speed, respectively, of the motor.

From the aforesaid description and diagram, it should be apparent that the error generating network algebraically sums a reference speed component, an actual speed component and a rate-of-change of speed component. In normal operation, the speed reference signal is opposed by the actual speed and rate of change signal components in the error generating loop 36. Thus, the input to the driver 34 is a speed error signal which is the difference of a reference and actual speed signals generated by the tachometer generator T. When the error signal is positive at terminal 58, the driver 34 will apply a positive signal on the gate electrode of valve V1 and a negative signal on the gate electrode of valve V2, thus forward biasing the gate junction of valve V2 and reverse biasing the gate junction of valve V2. The converse takes place when the input polarity to the driver 34 is reversed. In response to the error signal, the driver 34 will fire the proper valve V that will supply current to that field winding necessary to generate a torque of proper polarity to correct the error (the deviation of the speed from the reference).

The operation of the system through a full regulatory cycle is as follows. Assume first that the motor M is running in the forward direction as a result of the potentiometer arm 78 having been moved manually or otherwise to the position illustrated i.e. into the forward sector of the potentiometer. In this position of the arm, the reference source 64 provides a reference signal of polarity and magnitude representing forward direction and desired speed. Assume further that valve V1 is conducting as a result of positive drive on its gate electrode from the driver output line 52 in response to an error signal indicating that motor speed is below the chosen speed, as a result for example of change in load. Since line 52 is positive at this time, line 54 must be negative and the gate junction of valve V2 is reverse biased. Valve V2 is blocked. Valve V1 being gated, load current supplied by the source 32 flows from junction 40 to junction 46 through armature 30, forward field winding F1 and valve V1, thus producing forward torque in the motor. The commutating capacitor C charges to approximately $V_S - E_A$, with positive polarity at 48, and the motor accelerates in the forward direction until the tachometer T voltage equals and then exceeds the reference 64 voltage. ($V_S$ is the supply voltage; $E_A$ is the armature counter E.M.F.)

When the tachometer voltage exceeds the reference voltage, the resulting error signal is negative on input line 58 of driver 34. In response to this, driver 34 applies negative polarity drive to valve V1 and positive polarity drive to valve V2. This fires valve V2, and as a result places capacitor C across valve V1 with the polarity of the capacitor voltage in the reverse direction of the valve V1 thereby causing this valve to cease conduction. The reactive current flowing through forward field F1 flows through a discharge current path for the stored energy in field F1, which path is connected across field F1 and includes diode D1, resistor 38 and the armature 30. The impedance added by the armature counter E.M.F. helps to rapidly dissipate the stored energy in field F1. The discharge current flow through the discharge path is at a decreasing rate. In the meantime, current through the reverse field winding F2 builds up, and as soon as this current exceeds the current through forward field winding F1, a torque opposing the rotation of the motor is developed causing the motor to decelerate. Eventually, the current through field winding F1 will stop flowing.

With valve V1 non-conducting and valve V2 conducting, capacitor C again charges to voltage $V_S - E_A$, but this time with opposite polarity, that is positive at junction 44. With continued load current flow through field winding F2, the motor continues to decelerate until the tachometer voltage drops below the reference voltage.

As soon as the tachometer voltage drops below the reference voltage, the error generating circuit 36 applies an error signal which is positive at the driver input line 58 and negative at the driver input line 60. In immediate response to this condition, driver 34 applies a positive polarity drive signal to the gate electrode of valve V1 and a negative drive signal on the gate electrode of valve V2. This fires valve V1. As a result, capacitor C is placed across valve V2, applying a reverse voltage across this valve and thus blocking it. The stored energy current from field winding F2 is permitted to flow at a decreasing rate through the stored energy discharge path connected across field winding F2, and including diode D2, resistor 38 and the armature 30. In the meantime, current through the forward field winding F1 builds up and as soon as it exceeds the current through the reverse field winding F2, an accelerating torque will be developed which again brings up the tachometer voltage above the reference voltage thus completing a full cycle of oscillation.

From the above description, it is seen that this system provides a motor speed that oscillates at such high frequency and low amplitude about the reference level that, for all practical purposes, it is a smooth, steady speed equal to that called for by the reference voltage. Also from the preceding description, it is clear that the switching rate is determined by the rate at which the difference of the tachometer and reference voltage changes polarity. To obtain a rapid rate of switching, and thus maintain a high frequency and low amplitude speed oscillation about the reference, the regulator system should have a highly sensitive drive circuit so that a very small error (deviation of the tachometer voltage from the reference voltage) will trigger correcting action. During motor operation at constant speed, the conducting path is constantly switched from field winding F1 to field winding F2 and vice versa.

To reverse the rotation of the motor, the potentiometer arm 78 is moved to the reverse reference sector of the potentiometer which lies to the right of center tap 76 as viewed in the drawing. This injects into the error generating network 36, a speed reference signal whose polarity represents the desired reverse direction. In the example shown, this is negative at the potentiometer arm 78. As a result a net negative signal is applied to driver input terminal 58 and the driver 34 applies a positive drive signal to the gate of valve V2, and a negative drive signal to the gate of valve V1, thus gating valve V2 and blocking valve V1. As a result, the motor will decelerate from its former forward rotating mode, go through zero speed and then reverse rotation. The motor accelerates in the reverse direction until the tachometer voltage just exceeds the reference voltage, whereupon the regulating system will cycle as hereinbefore described for forward rotation. When the motor reverses polarity, its rotational energy will be dissipated in resistor 38 until reversal of rotation occurs.

Because of the sensitivity and response speed to changes of error signal polarity, the driver 34 operates essentially as an abruptly reversible two state device which together with the action of the commutating capacitor provides rapid on-off switching of the controlled valves V. From this it is seen that the driver 34 may be a bistable device which assumes one of its stable states to fire valve V1 in response to error signal of one polarity and its other stable state to fire valve V2 in response to error signal of opposite polarity.

If desired, an A.C. power source may be substituted for the D.C. source 32. However this restricts the circuit to half-wave operation and sacrifices some of the response speed, since regulatory control is effective only during the conducting half cycles.

While the invention has been illustrated in connection with a motor and a speed regulating system by way of example, it should be appreciated that the invention may be practiced in connection with any dynamoelectric machine having two excitation windings providing opposite control effects for controlling any condition of the machine.

It is to be understood that the herein described arrangements are simply illustrative of the principles of the invention, and that other embodiments and applications are within the spirit and scope of the invention.

We claim as our invention:

1. In a control system for a dynamoelectric machine having first and second excitation windings, one for causing the machine to produce an output of one sense, the other for causing the machine to produce an output of opposite sense, first and second power input terminals, means coupling one end of both of said windings to one of said input terminals, first and second controlled electric valves, each having a main current path and each being gateable in response to the application of a gating signal thereto, means coupling the other end of each winding to the other input terminal through the main current path of a different one of said valves, both valves being similarly poled relative to said input terminals, means for alternately applying gating signals to the respective valves, and circuit means connected to said valves for stopping conduction of one valve in response to initiation of conduction of the other valve, said circuit means including energy storage means which charges in response to conduction of one of said valves and which applies blocking voltage across that valve in response to initiation of conduction of the other valve.

2. A control system for a dynamoelectric machine having first and second excitation windings, one for causing the machine to produce an output of one sense, the other for causing the machine to produce an output of opposite sense, said system comprising first and second power input terminals, means coupling one end of both of said windings to one of said input terminals, first and second controlled electric valves, each having a main current path and each being gateable in response to the application of a gating signal thereto, means coupling the other end of each winding to the other input terminal through the main current path of a different one of said valves, both valves being similarly poled relative to said input terminals, asymmetric conducting means across each of said windings, means for alternately applying gating signals to the respective valves, and circuit means connected to said valves for stopping conduction of one valve in response to initiation of conduction of the other valve, said circuit means including capacitive means which charges in response to conduction of one of said valves and which applies that charge across the valve in the reverse direction of the valve in response to initiation of conduction of the other valve.

3. In a control system for an electric motor having respective forward and reverse excitation windings, a D.C. source having first and second output terminals, means coupling one end of both of said windings to one of said terminals, first and second controlled electric valves, each having a main current path and each being gateable in response to the application of a gating signal thereto, means coupling the other end of each winding to the other terminal through the main current path of a different one of said valves, both valves being similarly poled relative to said terminals, means for alternately applying gating signals to the respective valves, and circuit means connected to said valves for stopping conduction of one valve in response to initiation of conduction of the other valve, said circuit means including capacitive means which charges in response to conduction of one of said valves and which applies that charge across that valve in the reverse direction of the valve in response to initiation of conduction of the other valve.

4. An electric control system comprising a dynamoelectric machine having first and second excitation windings, one for causing the machine to produce an output of one sense, the other for causing the machine to produce an output of opposite sense, first and second power input terminals, first and second controlled electric valves, each valve having a control electrode, first and second power electrodes and a main current path extending from one to the other of its power electrodes, each valve being conductive in response to the application of a control signal to its control electrode, means connecting the first input terminal to one end of each of said windings, means connecting the other end of the first winding to the first power electrode of the first valve, means connecting the second power electrode of the first valve to the second input terminal, means connecting the other end of the second winding to the first power electrode of the second valve, means connecting the second power electrode of the second valve to the second input terminal, whereby said other end of each of said windings is coupled to the second input terminal through the main current path of a different one of said valves, both said valves being poled alike relative to said input terminals, capacitive means connected across said first power terminals of the valves, and means for selectively applying conduction initiating control signals to the control electrode of one or the other of said valves, whereby a control signal is applied to only one valve at a time.

5. An electric control system comprising a dynamoelectric machine having an armature and first and second field windings, one field winding for causing the machine to produce an output of one sense, the other field winding for causing the machine to produce an output of opposite sense, first and second power input terminals, first and second controlled electric valves, each valve having a control electrode, first and second power electrodes and a main current path extending from one to the other of its power electrodes, each valve being conductive in response to the application of a control signal to its control electrode, first means connecting the first input terminal to one end of each of said windings, said first means including said armature, second means connecting the other end of the first winding to the first power electrode of the first valve, third means connecting the second power electrode of the first valve to the second input terminal, fourth means connecting the other end of the second winding to the first power electrode of the second valve, fifth means connecting the second power electrode of the second valve to the second input terminal, whereby said other end of each of said windings is coupled to the second input terminal through the main current path of a different one of said valves, both said valves being poled alike relative to said input terminals, a commutating capacitor connected across said first power terminals of the valves, sixth means for selectively applying conduction initiating control signals to the control electrode of one or the other of said valves, whereby at any given time a control signal is applied to only one of said valves.

6. An electric control system comprising an electric motor having an armature and respective forward and reverse field windings, a D.C. source having first and second output terminals, first and second controlled electric valves, each valve having a control electrode, first and second power electrodes and a main current path extending from one to the other of its power electrodes, each valve being conductive in response to the application of a control signal to its control electrode, means including said armature connecting said first output terminal to one end of each of said windings, means connecting the other end of the forward winding to the first power electrode of the first valve, means connecting the second power electrode of the first valve to the second output terminal, means connecting the other end of the reverse winding to the first power electrode of the second valve, means connecting the second power electrode of the second valve to the second output terminal, whereby said other end of each of said windings is coupled to the second output terminal through the main current path of a different one of said valves, both said valves being poled alike relative to said output terminals, a commutating capacitor connected across said first power electrodes of the valves, means for selectively applying conduction initiating control signals to the control electrode of one or the other of said valves, whereby conduction initiating control signals are applied to only one valve at a time.

7. An electric control system comprising a motor having an armature and respective forward and reverse field windings, first and second power input terminals, first and second controlled electric valves, each valve having a control electrode, first and second power electrodes and a main current path extending from one to the other of its power electrodes, each valve being conductive in response to a control signal, means including said armature connecting the first input terminal to one end of each of said windings, means connecting the other end of the forward winding to the first power electrode of the first valve, means connecting the second power electrode of the first valve to the second input terminal, means connecting the other end of the reverse winding to the first power electrode of the second valve, means connecting the second power electrode of the second valve to the second input terminal, whereby said other end of each of said windings is coupled to the second input terminal through the main current path of a different one of said valves, both said valves being poled alike relative to said input terminals, discharge path means connected to said field windings for discharging stored energy from each winding when its associated controlled valve is blocking, a commutating capacitor connected across said first power terminals of the valves, and means for alternately applying control signals to the control electrodes of the respective valves.

8. In a system for regulating a condition controlled by a dynamoelectric machine having first and second excitation windings for providing oppositely related control effects on the machine, first and second power input terminals, first and second controlled electric valves each having a main current path which is rendered conductive in response to a gating signal applied to the valve, means coupling one of said input terminals to one end of both of said windings, means coupling the other end of each of said windings to the other input terminal through the main current path of a different one of said valves, means responsive to deviation of said condition in one direction from a predetermined norm for applying a gating signal to one of said valves, means responsive to deviation of said condition from said norm in the opposite direction for applying a gating signal to the other of said valves, and circuit means connected to said valves for stopping conduction of one valve in response to initiation of conduction of the other valve, said circuit means including energy storage means which charges in response to conduction of one of said valves and which applies that charge as blocking voltage across that valve in response to initiation of conduction of the other valve.

9. In a system for regulating a condition controlled by a dynamoelectric machine having first and second excitation windings for providing oppositely related control effects on the machine, first and second power input terminals, first and second controlled electric valves each having a main current path which is rendered conductive in response to a gating signal applied to the valve, means coupling one of said input terminals to one end of both of said windings, means coupling the other end of each of said windings to the other input terminal through the main current path of a different one of said valves, means responsive to deviation of said condition in one direction from a predetermined norm for applying a gating signal to one of said valves, means responsive to deviation of said condition from said norm in the opposite direction for applying a gating signal to the other of said valves, capacitive means connected in circuit with said valves to be charged in response to conduction of the respective valves, said capacitive means being responsive to initiation of conduction in one valve to apply a reverse voltage across the other valve to stop conduction through the latter valve.

10. In a system for regulating the speed of an electric motor having respective forward and reverse excitation windings for providing oppositely related control effects on the motor, first and second power input terminals, first and second controlled electric valves each having a main current path which is rendered conductive in response to a gating signal applied to the valve, means coupling one of said input terminals to one end of both of said windings, means coupling the other end of each of said windings to the other input terminal through the main current path of a different one of said valves, means responsive to deviation of said speed in one direction from a predetermined norm for applying a gating signal to one of said valves, means responsive to deviation of said speed from said norm in the opposite direction for applying a gating signal to the other of said valves, capacitive means connected in circuit with said valves to be charged in response to conduction of the respective valves, said capacitive means being responsive to initiation of conduction in one valve to apply a reverse voltage across the other valve to stop conduction through the latter valve.

11. The combination as in claim 8 wherein said machine is a motor and said condition is the speed of the motor.

12. The combination as in claim 8 wherein said machine is a motor having an armature, and wherein said means coupling one of said input terminals includes said armature, whereby said one input terminal is coupled through said armature to said one end of both of said windings.

13. The combination as in claim 9 wherein there is a discharge path including asymmetric current conducting means connected across each of said windings for discharging that winding when its associated valve is blocked.

14. The combination as in claim 10 wherein said motor has an armature which is included in said means for coupling one of said input terminals, whereby said one input terminal is coupled through said armature to said one end of both windings.

15. In a system for regulating a condition controlled by a dynamoelectric machine having first and second excitation windings for providing oppositely related control effects on the machine, first and second power input terminals, first and second controlled electric valves, each valve having a control electrode, first and second power electrodes and a main current path extending from one to the other of its power electrodes, each valve being conductive in response to the application of a control signal to its control electrode, means connecting the first input terminal to one end of each of said windings, means connecting the other end of the first winding to the first power electrode of the first valve, means connecting the second power electrode of the first valve to the second input terminal, means connecting the other end of the second winding to the first power electrode of the second valve, means connecting the second power electrode of the second value to the second input terminal, whereby said other end of each of said windings is coupled to the second input terminal through the main current path of a different one of said valves, said valves being poled alike relative to said input terminals, means responsive to deviation of said condition in one direction from a predetermined norm for applying a gating signal to one of said valves, means responsive to deviation of said condition from said norm in the oposite direction for applying a gating signal to the other of said valves, and capacitive means connected across said first power terminals of the valves for ending conduction of one valve in response to initiation of conduction of the other valve, said capacitive means charging in response to conduction of one of said valves and applying the charge as a blocking voltage across that valve in response to initiation of conduction of the other valve.

16. The combination as in claim 15 wherein said machine is a motor having an armature, and wherein said means coupling one of said input terminals includes said armature, whereby said one input terminal is coupled through said armature to said one end of both of said windings.

17. The combination as in claim 16 wherein said condition is the speed of said motor.

References Cited by the Examiner
UNITED STATES PATENTS

| | | | |
|---|---|---|---|
| 3,154,730 | 10/1964 | Houldin | 318—341 |
| 3,191,113 | 6/1965 | Gargani | 318—300 |

OTHER REFERENCES

G.E. SCR Manual, 2nd Edition, Auburn, New York, TK 2798 G4g 1961, pp. 73–75.

References Cited by the Applicant
UNITED STATES PATENTS

| | | |
|---|---|---|
| 2,669,684 | 2/1954 | MacGeorge. |
| 3,159,777 | 12/1964 | Manteuffel. |

OTHER REFERENCES

"Electronics" Engineering Edition, March 28, 1958, p. 52, "Solid State Thyratron Switches Kilowatts."

ORIS L. RADER, *Primary Examiner.*

S. GORDON, J. C. BERENZWEIG, *Assistant Examiners.*